United States Patent Office 3,578,463
Patented May 11, 1971

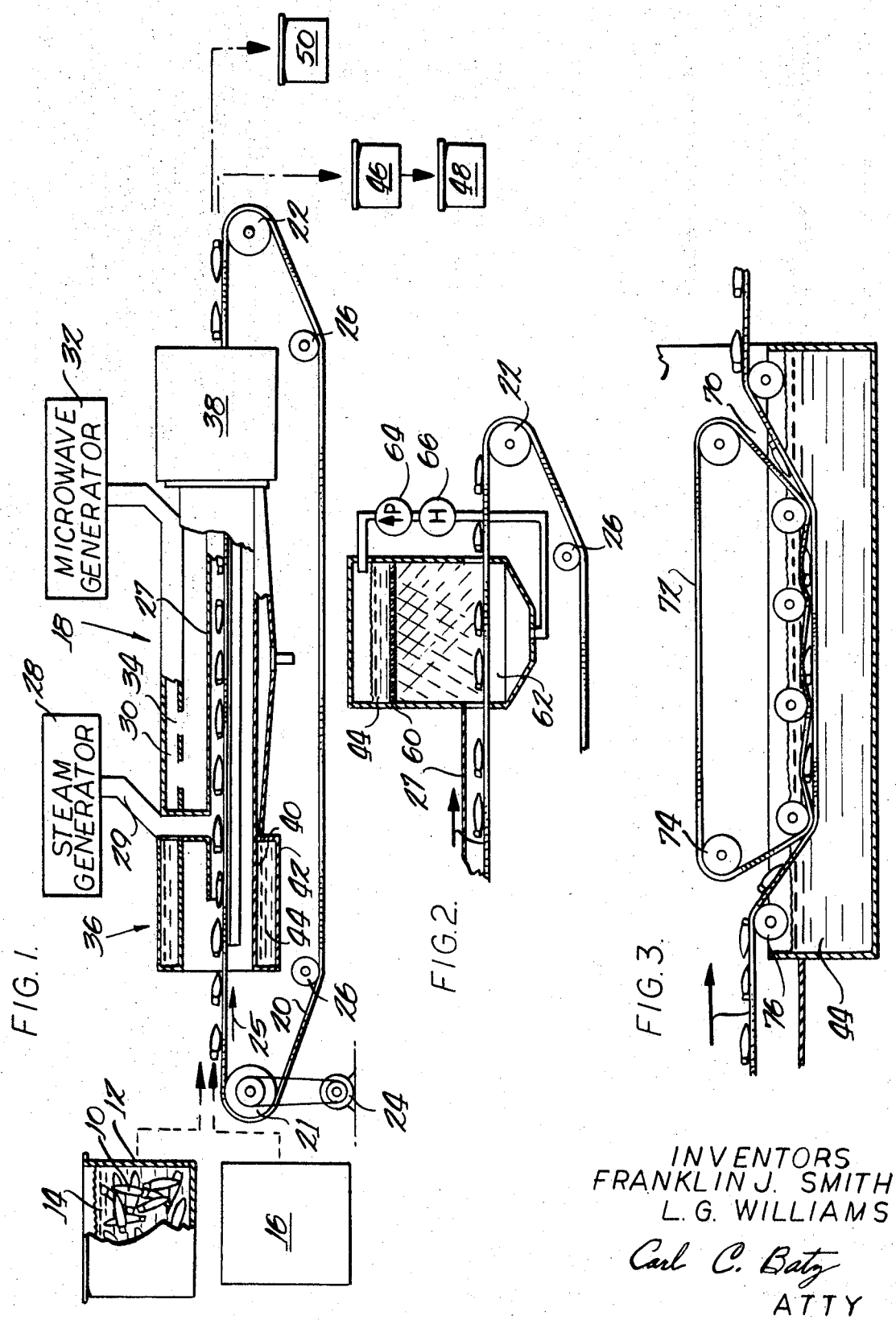

3,578,463
MICROWAVE BLANCHING
Franklin J. Smith, Diablo, and L G Williams, Martinez, Calif., assignors to Cryodry Corporation, San Ramon, Calif.
Filed Mar. 8, 1967, Ser. No. 621,645
Int. Cl. A23b 7/06; A23l 3/18
U.S. Cl. 99—103     4 Claims

ABSTRACT OF THE DISCLOSURE

Treating vegetables by successively hot water blanching with water above 185° F. or atmospheric steam, finish blanching with the application of microwave energy to the point of enzyme deactivation and finish blanching with hot water above 185° F. Optionally, a final quench in cold water may be used.

---

This invention relates to an improved process for treating a food product using microwave energy and to the product produced therefrom.

In the past, food products have been treated with microwave energy simply by passing them through a microwave heat treating chamber. With fragile food products, such as cauliflower, broccoli, asparagus, brussel sprouts, cabbage and lima beans, considerable loss due to attrition, desiccation or shriveling is observed.

Also, the time to heat treat these products with microwave energy is undesirably more than deemed necessary or desirable for efficient operation. Since the product must be heat treated properly to inactivate certain enzymes, it is imperative that proper care be observed during such treatment. For example, with corn on the cob, if its enzymes are not inactivated, a cob-like flavor will permeate the kernels during any period of frozen storage or during thawing in boiling water.

Blanching of food products is the generally recognized method of combating enzymes in food products. Food Products, first edition, Chemical Publishing Co., Inc., Brooklyn, N.Y., 1947, teaches, for example, that broccoli should be blanched in boiling water for three to four minutes or in steam for six to eight minutes.

Accordingly, an object of this invention is to provide an improved process for heat treating food products with microwave energy with the substantially elimination of the above discussed undesirable end results.

Another object is to provide an improved blanching process, using microwave energy in combination with hot water or steam.

Still another object is to provide a process of the above character, where the total time and energy required to properly microwave heat treat the food product is substantially reduced.

A further object is to provide a process of the above character for fragile food products, whereby attrition and/or desiccation or shriveling of the kernels or the flower buds is virtually eliminated.

A still further object is to provide a process of the above character whereby a fresher flavor is provided.

Another object is to provide a process of the above character which requires a lesser microwave power requirement to internally blanch the food product.

Another object is to provide a process of the above character which blanches even the center sections of the food product, regardless of its thickness or non-uniformity.

Another object is to provide a process of the above character which includes a finish hot water blanch for correcting any non-uniformity of the microwave blanching.

Other objects of the invention will in part be obvious and will in part appear hereinafter.

Briefly, the process of the present invention comprises the steps of preliminarily surface blanching the food product with water above 185° F. or with atmospheric pressure steam, and thereafter finish blanching the food product by the application of microwave energy, preferably while the food product is blanketed with steam. When the food product is heat treated in this fashion, the microwave energy required to uniformly blanch the center of large pieces of product is substantially reduced. In addition, the process results in a minimum of product loss due to overblanching. Also, attrition of the product is kept to a minimum so that a fragile product, such as asparagus, broccoli, and cauliflower, may be treated without fear of damage.

The process can and preferably does further include a finish hot water blanch immediately after the microwave blanch. This finish blanch in hot water aids in correcting any prior occurring non-uniformity of surface blanching due to any non-uniformity of steam distribution before and during the microwave processing.

A still further desired step is that of quenching the product in cold water having a temperature of approximately 45° to 65° F. This latter step minimizes undesirable desiccation or moisture loss, and eliminates undesirable chemical changes which can occur due to excessive blanching.

Alternatively, the cold water quench step may be performed immediately after the application of microwave energy, especially where non-uniform blanching or fragile food products present no problem.

The invention accordingly comprises the several steps and the relation of one or more of such steps with respect to each of the others, and the product possessing the features, properties, and the relation of elements, which are exemplified in the following detailed disclosure, and the scope of the invention will be indicated in the claims.

For a fuller understanding of the nature and objects of the invention, reference should be had to the following detailed description and examples taken in connection with the accompanying drawing, in which:

FIG. 1 is a side view, partly in section, and partly schematical, of one embodiment of apparatus useful in heat treating food products, in accordance with the invention.

FIG. 2 is a cross-sectional view of a second embodiment of terminating or absorbing section of the microwave chamber of FIG. 1.

FIG. 3 is a cross-sectional view of a third embodiment of the terminating or absorbing section.

As seen in FIG. 1, the food product 10, in this case, corn on the cob, is first subjected to a hot water or steam bath (about 150° to 205° F.) to surface blanch it. This is accomplished by immersing it in a vat 12 of hot water 14 or a steam chest 16.

After being surface blanched, the food product is transferred to a microwave heat chamber or oven 18. The oven 18 is preferably of the continuous tunnel type, as illustrated. It is formed of electrically conducting walls such as metal.

An endless conveyor 20 traverses the length of the chamber.

The conveyor is formed of a dielectric belt material and is mounted on rotating drums 21 and 22 disposed outside each end of the oven 18, with a drive means 24 being coupled to one of the drums (21 in this instance) to drive the conveyor in the direction indicated by arrows 25. Guide rolls 26 provide for proper tension and travel of the conveyor belt.

Overlying the conveyor, in as close a position as the food product being treated permits, is a moisture enclosing shroud 27 of dielectric material. A steam generator 28 communicates with the interior of the shroud via conduit 29.

A long waveguide 30 for injecting microwave energy into the oven 18 extends along the upper surface of the oven. The waveguide may form an integral part of the wall of oven 18. The waveguide receives power from a suitable microwave generator 32, preferably coupled to one end thereof, the opposite end of the waveguide being closed.

A series of openings, such as transverse slots 34, are spaced along that wall of waveguide 30 which faces the interior of oven 18. These openings provide for the distributed injection of energy into the chamber. In the chamber, the energy is repeatedly reflected between the opposing walls of oven 18 and thus the product on the conveyor 20 is continually penetrated by the microwaves. Shroud 27, being dielectric, does not interfere with such reflection or penetration of the food product. In passing through the product, a portion of the energy is absorbed with consequent heating thereof.

Terminating or absorbing sections 36 and 38 which function to suppress the escape of microwave energy from its ends are positioned at the ends of the chamber 18.

In the embodiment shown in FIG. 1, each terminating section has a volume of water 44 or other lossy liquid which acts as an absorber of the microwave energy. It is contained within an inner dielectric wall 40 and spaced conducting outer wall 42 which may comprise the ceiling, the floor or the two side walls or any combination of these, of the terminating section. Preferably, the water is contained in the ceiling and floor. Thus, as the microwave energy is injected at right angles to the axis of oven 18, it propagates toward the ends, by repeated reflections between opposite conducting walls thereof. Upon reaching the terminating sections 36 or 38, such energy repeatedly passes through the inner dielectric wall 40 and the body of water 44 or other lossy liquid maintained on the outer side thereof. It is therefore attenuated rather than being emitted from the oven and thus the terminating sections act, in toto, as barriers to the escape of microwave energy.

After the food product 10 traverses the microwave oven 18, it is preferably immediately immersed in a hot water bath 46 containing hot water or steam at a temperature of approximately 200° to 205° F. for approximately two minutes. Such hot water bath treatment is an effective means of correcting any non-uniformity of surface blanching which may have occurred in the vat 12 of hot water 14 or the steam chest 16.

The hot water bath is then preferably immediately followed by a quench in cold water, for example, by immersing it in a vat 48 of water at a temperature of approximately 65° F. Such quenching in cold water is an effective means for minimizing desiccation or moisture loss, and eliminating any undesirable chemical changes due to excessive blanching.

If non-uniformity is not evident, an immediate quench in cold water in tank 50, after the application of microwave energy, may be used.

In the embodiments shown in FIGS. 2 and 3, the terminating sections serve the joint function of microwave attenuators as well as hot water (or steam or cold water, if desired) baths. Indeed, if properly sectioned, the terminating sections may function both as a hot water and as a cold water quench means.

In the embodiment shown in FIG. 2, the terminating section 38 of oven 18 is shown in cross-section to illustrate how its acts as both a microwave attenuator and a hot water bath. The upper inner wall 40 of dielectric material is perforated at various locations 60, whereby the water 44 in the upper portion of the terminating section showers downwardly onto the food product 10 as a substitute for the hot water bath 46 of FIG. 1. The water is collected in sump 62 of the terminating section 38 and recirculated, with or without heating, by pump 64 and heater 66 respectively to the upper portion of the terminating section. Thus the heat usually generated in the lossy material of the terminating section is utilized (possibly with supplemental heating via heater 66) to finish blanch the food product.

In the embodiment shown in FIG. 3, the food product is immersed into the water 44 of the terminating section 38 by providing an open upper face 70 for the lower portion of said section and utilizing a clamp conveyor 72 with appropriate guide rollers 74 and 76 to force conveyor 20 to submerge into the open faced lower portion of the terminating section. One could utilize two or more such devices for other quenches, such as the cold water quench 48 or 50 of FIG. 1.

Reference is now made to specific examples.

In each of the examples which follow, a microwave oven having a tunnel with an eight foot length microwave energy zone through which the product is conveyed is used. Internally, the width of the microwave tunnel is approximately 30 inches. The conveyor comprises a perforated Mylar belt 16 inches in width. The frequency of the microwave energy is 915 megacycles per second. The expressed kilowatts of applied microwave power is the amount of energy actually beamed into the tunnel cavity from the waveguide system, while the residence times expressed are the times the product traverses the length of the tunnel. The temperature of the center of the thick sections of the product is measured by insertion of the metal stem of a Weston meat thermometer, Model 2261, range 0° F. to 220° F., immediately after removal of the products from the microwave tunnel.

With respect to the examples immediately following, it might be noted that in present commercial operations, it is generally recommended that corn on the cob be steam blanched for at least eight minutes. However, most packagers blanch for a longer period to attain a central cob temperature of at least 175° F., which is considered necessary to irreversibly inactivate the enzyme systems within the corn in order to preserve its fresh flavor even after frozen storage. If not inactivated, a cob-like flavor will permeate the kernels during freeze storage and during thawing.

EXAMPLE I

Corn on the cob

Golden Bantam variety corn on the cob is husked.

Four ears are blanched for a total of eight minutes in boiling water. After removal from the boiling water, the temperature at the center of each cob is measured. It will be found to range from 160° F. to 172° F., depending upon the size of the cob. This temperature, as noted above, is insufficient to irreversibly inactivate the enzyme system. Longer than eight minutes is obviously required for effective and proper blanching.

Four ears of the same lot are then blanched initially for three minutes in boiling water. The temperature at the center of the cob increases from about 68° F. to about 80° F. These four ears are then placed on the belt of the microwave oven described above. The belt speed is 3 feet/minute and the microwave power is set at 4.5 kilowatts of energy to the tunnel. After exposure of 160 seconds of residence time, the center of each cob is again measured for temperature. The internal cob temperature will be found to range from 200° to 210° F. Thus, total time for complete blanching, using a combination of boiling water and microwave energy, is only five minutes and forty seconds. Also observed will be the uniform blanching that has occurred. There is no apparent desiccation.

EXAMPLE II

Corn on the cob

Four additional ears of the same lot as in Example I are initially blanched for four minutes in boiling water.

The temperature at the centers of the cobs increases from about 68° F. to about 118° F. The four ears are then immediately processed with microwave energy by passage through the microwave oven such as shown in FIG. 1. The belt speed and residence time of exposure to microwave energy are the same as in Example I. However, the kilowatts of applied microwave power is only 3.3 kw. After 160 seconds' exposure, the ears are removed and the internal cob temperature measured. It will be found that the temperature is within the range of 206° F. to 210° F.

EXAMPLE III

Corn on the cob

In this example, a 12-foot microwave unit tunnel is equipped with a continuous nylon belt feed system and a steam atmosphere in the microwave tunnel. The applied microwave power intensity is 14 kw. into the tunnel. After two minutes of exposure to the microwave power in the steam atmosphere, the temperatures of the centers of the corn cobs are found to be in the range of 203° F. to 205° F. However, some areas of under-blanching of the kernels were observed on the surface of the corn cobs. Hence, the product was immediately dropped into a hot water bath at 205° F. for two minutes to attain completeness of surface blanching prior to quenching the heat in fresh water at 65° F.

The reported optimal times for proper blanching of broccoli are:

3 to 4 minutes in boiling water, or
6 to 8 minutes in steam.

Again, enzyme inactivation is used as an indication of proper blanching. It is checked using thin cross-sectional slices of the thick stems. The test involves wetting a freshly cut surface of the broccoli stem first with a solution of 2.5% guaiacol in ethanol and then with a few drops of 1% hydrogen peroxide. The development of a pink-brown discoloration, which defines the areas in which the enzyme, peroxidase, inactivation is not completed, is observed and used as an indication of insufficient blanching.

Another desirable aspect of microwave blanching broccoli is retention of a desirable high degree of bright green color. This is an indication of chlorophyll preservation. Where the chlorophyll is destroyed, or rather converted to pheophytin, an undesirable olive green color appears.

In the examples which follow, microwave treatment is used as a partial substitute for the boiling water or steam. In each instance, large clusters of broccoli having thick stem sections of 1 inch to 1½ inch diameter are used, because clusters of this size are not at all uncommon in a field harvest delivery of fresh cut broccoli heads.

EXAMPLE IV

Broccoli

Two large clusters of broccoli (about 445 gms.—about one pound in weight) with thick stem sections (1 inch to 1½ inch diameter) are dropped into a covered pot of boiling water for four minutes. The product is removed from the water and temperatures are quickly measured. The temperature of the centers of the stems ranges between 150° F. to 156° F. The product is then quenched for a few minutes in 65° F. water until the stem centers reach a temperature of about 75° F.

Three thin slices of each cluster are then cut from the cross section of each thick stem and subjected to the enzyme test. All six slices are peroxidase positive, which indicates incomplete blanching.

The two clusters of broccoli are then passed through the microwave oven described above. A residence time of 155 seconds and an applied power level of 3.3 kw. is used. The product stem center temperatures are then tested and found to be 190° F. to 195° F.

The product is then quenched in tap water (65° F.) and cross section slices of the stems are checked for enzyme activity. The one inch diameter stems are peroxidase negative, but the one and one-half inch stems are peroxidase positive.

The larger cluster is again recycled through the microwave tunnel for an additional 155 seconds residence time at an applied microwave power level of 6 kw. into the tunnel. The stem center temperature increases to 210° F. and the enzyme test is peroxidase negative. While the enzyme inactivation is complete, the second microwave energy treatment is excessive in that about 11% juice loss is encountered.

EXAMPLE V

Broccoli

This test is a boiling water blanch to serve as a comparison control on the large clusters of broccoli (1 inch to 1½ inch diameter stems). The control sample is from the same lot of raw material, assumed to be of the same variety and maturity and probably picked from the same field location on the same date of harvest.

Two large typical clusters of said broccoli are dropped into a covered pot of boiling water. After six minutes in the pot, the product is removed and stem center temperatures are measured. The temperatures range from 185° F. to 195° F. After measurement of the temperature, the product is quickly quenched in 65° F. tap water. Cross sectional slices of the stems are checked for enzyme inactivation and are found to be completely peroxidase negative.

It might be noted that the six minute boiling water blanch is longer than the optimum desired for chlorophyll preservation. The undesirable olive green color of chlorophyll conversion to pheophytin is evidenced in the product.

EXAMPLE VI

Broccoli

Two large clusters of broccoli with stems of 1 inch to 1½ inch diameter are dropped into a covered pot of boiling water. After there minutes of such hot water blanch, the clusters are removed and the stem center temperatures determined. They are found to be 170° F. and 175° F. All cross sectional slices are peroxidase positive indicating incomplete inactivation of the enzymes.

The clusters are then immediately fed through the microwave oven described above using a 150 second residence time and a power level of 5.25 kw. No appreciable juice loss occurs during the microwave finish blanch.

With such treatment, the final stem center temperatures will be about 200° F. to 205° F. and all peroxidase tests will be negative.

The broccoli is quenched in 65° F. tap water, yielding a product with the desirable bright green color of chlorophyll retention. The drained product is placed in a sealed polyethylene bag and slowly frozen overnight in a deep freeze unit. Even after freezing, the desirable bright green color is still observable.

With respect to the next group of examples relating to the finish blanching of cauliflower, it should be noted that in normal commercial processing of cauliflower, it is washed and then each head is trimmed and broken into smaller pieces or segments. It is then either blanched in boiling water or in steam at atmospheric pressure. The recommended times for blanching cauliflower are:

Boiling water bath—2 to 3 minutes, or
Atmospheric steam—4 to 6 minutes.

A temperature of 175° F. or higher is usually required for enzyme inactivation.

EXAMPLE VII

Cauliflower

About ½ pound of cauliflower segments are dropped into a covered pot of boiling water and after 3½ minutes, the segments are removed and examined. Physical measurement will show that the central stem temperature of the thickest segment (3 inch diameter) is only about 145° F. An enzyme test will show that it is peroxidase positive in about one cubic inch volume in the center of the cauliflower stem. A smaller sized (2 inch diameter) segment, under the same circumstances, will be peroxidase negative.

About ½ pound of cauliflower segments from the same lot are dropped into a covered pot of boiling water. After one minute in boiling water, the segments are removed and temperatures measured. The centers of the larger segments will reach about 95° F. to 100° F., which is insufficient for enzyme inactivation.

The segments are then passed through a microwave oven such as shown in FIG. 1. The residence time therein is 152 seconds, while the microwave power level is 5.25 kw.

Under such conditions, the temperatures of the centers of the cauliflower segments will be approximately 210° to 212° F. The segments will be peroxidase negative.

The product is then quenched in 65° F. water and drained and then enclosed in a polyethylene bag and slowly frozen over night in a deep freeze unit.

EXAMPLE VIII

Cauliflower

In this example, a lower power level of microwave energy is used. Otherwise, the same procedure as in Example VII is used.

The exposure or residence time in the microwave energy field is 152 seconds at an applied power level of 2.6 kw. (approximately ½ of that of Example VII). After passage through the microwave oven, the temperatures of the centers of the cauliflower segments are found by measurement to be in the range of 200° F. to 205° F. Testing for enzyme inactivity shows the product to be peroxidase negative.

As in Example VII, the cauliflower is drained, then enclosed in a polyethylene bag, and slowly frozen overnight in a (−20° F.) deep freeze unit.

From a study of Examples VII or VIII, it can be concluded that the combination of a one minute boiling water blanch plus 2½ minutes microwave finish blanch is much more effective than a 3½ minute boiling water blanch. Evidently, more time is required to completely inactivate the enzymes when blanching with boiling water alone. Hence, over-blanching and loss of fresh vegetable flavor in the outermost surface portions of the cauliflower would probably occur if boiling water blanch was used solely.

In the next group of examples, the treatment of asparagus is described. The blanch times usually recommended are as follows:

2 to 3 minutes boiling water, or
4 to 7 minutes atmospheric steam.

EXAMPLE IX

Asparagus

A 4½ lb. sample of oriented asparagus spears are placed in a polyethylene bag to retain a steam atmosphere around the product and passed through the microwave oven. For this situation, the microwave power intensity is 4.5 kw. at 75% (12.0 kv., 0.55 amp.) and the residence time is 4 minutes.

Following such passage through the oven, the temperature of the centers of the stems is measured and found to be 155° F., 165° F., 177° F. as random values.

The product is then quenched in 60° F. tap water, drained and weighed. The yield is 4¼ lbs., but all spears tested are still peroxidase positive and not fully blanched.

EXAMPLE X

Asparagus

In this run a microwave power intensity of 9.9 kw. at 75% (12 kv., 1.1 amps.) is utilized. The residence time is 4 minutes.

After 4 minutes of microwave at 9.9 kw. to the eight foot tunnel, the product stem centers are 193° F. to 204° F. at random. After quenching in 60° F. tap water, and draining, the net weight of blanched asparagus is 4 lbs. 5 oz. (initial weight—4 lbs., 12½ oz.). The peroxidase test is 100% negative, and color is very good. Some slight desiccation is observed of the smaller spears, which are a part of this sample.

EXAMPLE XI

Asparagus

In this run, two levels of microwave intensity are used:

1 minute at 14.4 kw.
2½ minutes at 9.9 kw.
Product centers: 200° F.
Peroxidase: negative Slight desiccation of ½% of spears is observed, and occurs only with the smaller size spears present in the sample.

EXAMPLE XII

Asparagus

Asparagus spears (5 lbs.) are pre-blanched by a one minute immersion in hot water (210° F. to 180° F.). The product is then subjected to microwave energy for three minutes at a 5 kw. intensity in the eight foot tunnel described above.

After quenching in cold water (60° F.) the drained weight yield is 4 lbs. 6 oz. and the product is peroxidase negative, and is of a grade A color and character. No desiccation of the small spears is observed in this product sample.

It appears from the above examples that the combination of hot water pre-blanch and microwave finish blanch yields a more satisfactory product. The longer 4 minute microwave blanch time of Example XI does not yield a fully blanched product and any attempts to increase the microwave intensity or time of treatment results in at least some desiccation of the asparagus spears.

In the above cited examples, the process of the invention was shown to be applicable to preparing corn on the cob, broccoli, cauliflower and asparagus, but it is to be understood that the process is equally applicable to blanch other vegetables prior top ackaging and freezing them. Thus, brussel sprouts, cabbage, lima beans, peas, beans, artichokes, and the like could be blanched in accordance with the process of this invention.

The process may also be used to process certain fruits. If desired and with certain fruits and vegetables, the follow-up hot water blanch and the cold water bath both can be eliminated and, in some cases, it is advantageous to eliminate just the follow-up hot water blanch. The process to be used with any particular fruit or vegetable to provide the best results can be easily and quickly determined, simply by comparing the results of heat treating the product using the different steps.

The above described method of heat treating food products is preferred over presently used processes for several reasons.

Less total blanching time is required than with steam or hot water alone, especially with corn on the cob. Shortening of the total heating orb lanching time results in a fresher vegetable flavor.

And while microwave blanching alone provides a fresh vegetable flavor, the combination with an initial hot water or steam blanch provides an economic advantage. This is because low cost hot water or steam power is used to first partially raise the temperature while microwave power, which costs more, does the more difficult task of internally blanching the food product.

It is also found that with certain fragile food products, such as broccoli, artichokes, and cauliflower, overblanching of the flowery buds is generally eliminated. There is also a minimum of food product loss due to attrition of the buds.

A still further advantage is that microwave blanching enables a finish blanching of the center sections more quickly and without effect by thick or non-uniform sections. This is particularly true when using a microwave oven having a frequency of 915 megahertz wherein the half power penetration depths are greater than those observed in a 2450 megahertz oven. Uniformity is also more rapidly accomplished in microwave ovens of the continuous tunnel types in contrast to the customary non-uniformity in institutional or small domestic ovens, see "Determination of Cooking Power Distribution in Electronic Ranges," by H. J. Van Zante, Journal of Home Economics, vol. 58, No. 4, pages 292–295, April 1966.

It will thus be seen that the objects set forth above, among those made apparent from the preceding description, are efficiently attained, and since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A process for blanching vegetables comprising the steps of preliminarily surface blanching said vegetables by the application of at least one member of the group consisting of hot water above 185° F., and atmospheric pressure steam, thereafter finish blanching said vegetables by the application of microwave energy thereto at a frequency and for a period of time sufficient to deactivate enzymes present therein and then finish blanching with hot water above 185° F. immediately after said application of microwave energy whereby any non-uniformity in blanching is corrected.

2. The process of claim 1 wherein said food product is subjected to said finish hot water blanch above 185° F. for a period of at least two minutes.

3. The process of claim 1 further including the step of quenching said food product in cold water of 45° to 65° F. immediately after said finish hot water blanch.

4. The process of claim 1 wherein said finish hot water blanch is performed with water temperature of at least 200° F. and wherein the cold water used in said quenching is at a temperature of at least 65° F.

References Cited
UNITED STATES PATENTS

| | | | |
|---|---|---|---|
| 1,421,750 | 7/1922 | Willison | 99—103 |
| 2,403,871 | 7/1946 | McBean | 99—103 |
| 3,398,251 | 8/1968 | Jeppson et al. | 99—217 |
| 3,409,447 | 11/1968 | Jeppson et al. | 99—217 |

RAYMOND N. JONES, Primary Examiner

J. M. HUNTER, Assistant Examiner

U.S. Cl. X.R.

99—217